Feb. 5, 1963  O. J. B. ORWIN  3,076,418
CONVEYOR SYSTEMS

Filed June 14, 1961  4 Sheets-Sheet 1

INVENTOR
OLAF J.B. ORWIN
By
AGENT

Feb. 5, 1963 O. J. B. ORWIN 3,076,418
CONVEYOR SYSTEMS
Filed June 14, 1961 4 Sheets-Sheet 2

INVENTOR
OLAF J. B. ORWIN

INVENTOR
OLAF J. B. ORWIN
BY
AGENT

Feb. 5, 1963  O. J. B. ORWIN  3,076,418
CONVEYOR SYSTEMS
Filed June 14, 1961  4 Sheets-Sheet 4

INVENTOR
OLAF J.B. ORWIN
By [signature]
AGENT

United States Patent Office 3,076,418
Patented Feb. 5, 1963

3,076,418
CONVEYOR SYSTEMS
Olaf J. B. Orwin, Quinton, Birmingham, England, assignor to Fisher & Ludlow Limited, Tipton, England, a British company
Filed June 14, 1961, Ser. No. 117,160
Claims priority, application Great Britain June 15, 1960
6 Claims. (Cl. 104—172)

This invention relates to conveyor systems of the kind comprising an endless conveying element provided with a plurality of driving dogs spaced along the length of the element, a plurality of article carriers advanceable along a track, means for transmitting drive from said conveyor element driving dogs to said carriers and means for disengaging the drive from any particular dog to an associated carrier during the continued advancement of the conveyor element for the purpose of arresting the advancement of one or more specific carriers.

Conveyor systems of the foregoing kind, herein referred to as the kind specified, are already known in which the drive from any particular dog to an associated carrier is disengaged by lifting part of the conveyor element adjacent such dog so as thereby to raise such dog with the adjacent conveyor element clear of the carrier to be arrested.

It is also known in conveyor systems of the above kind for the dogs themselves to be displaceable in relation to the conveyor element for the purpose of disengaging the drive from a particular dog to an associated carrier.

The first of these two arrangements necessitates the provision of a rather complex arrangement of conveyor element lifting means at each of the appropriate carrier drive disengaging positions, while the second of these two arrangements, insofar as it requires a displaceable mounting for each dog, necessitates the provision of a conveyor element of relatively complex and expensive construction.

The present invention has for its object the provision of an alternative arrangement which permits of a conveyor element of a particularly simple design and construction being employed.

According to the present invention, each carrier is provided with drive transmitting means in the form of a driving shoe having a dog engaging face, the shoe being mounted for pivotal movement about an axis transverse to the direction of carrier advancement and between a dog disengaged position and a dog engaging position in which the dog engaging face is directed rearwardly of the direction of advancement into the path of an advancing dog, shoe displacing means located at a number of predetermined positions along the length of the track and movable in relation thereto between carrier arresting and carrier driving positions in which the shoe of an advancing carrier is respectively displaced by the shoe displacing means into a dog disengaging position, or in the case of an arrested carrier, is displaceable into a position to be engaged by the next successively advancing dog, the arrangement being such that the drive to a carrier can be disengaged without displacing the conveyor element or any part thereof, including any of its driving dogs, transversely of the direction of advancement of said element.

Preferably the shoe displacing means comprises a cam member movable into and out of the path of each advancing carrier shoe, the cam member in the former position, being adapted to engage with a cam follower portion provided on the shoe, so as to displace this relative to the carrier out of engagement with the driving dog.

Preferably, for example, each shoe pivot is disposed intermediate the two ends of the shoe, and the rear end is adapted to be engaged by a driving dog and the cam follower portion is constituted by a part of the forward portion of the shoe.

Where, as is preferred, the carrier is disposed at a position below the conveyor element with the dogs dependent from the latter, the arrangement may be such that the forward portion of the shoe is lifted to displace the rear portion downwardly about its pivot to effect disengagement from the driving dog.

Preferably in association with each drive disengaging means, is a stop member, adapted when the shoe displacing means is displaced into the drive disengaging position, to itself be displaced into an operative position into the path of an advancing carrier, so as positively to inhibit further advancement of the carrier when the drive thereto has been disengaged.

Each shoe may be spring or gravity loaded into its dog engaging position, being retained against such loading in a dog disengaged position by the engagement of the cam member with the part of the shoe as above described.

The invention is illustrated in the accompanying drawings wherein:

FIGURE 6 is a part sectional end view of the carrier shown in FIGURE 2, depicting its driving shoe in the dog disengaged position.

Figure 1:
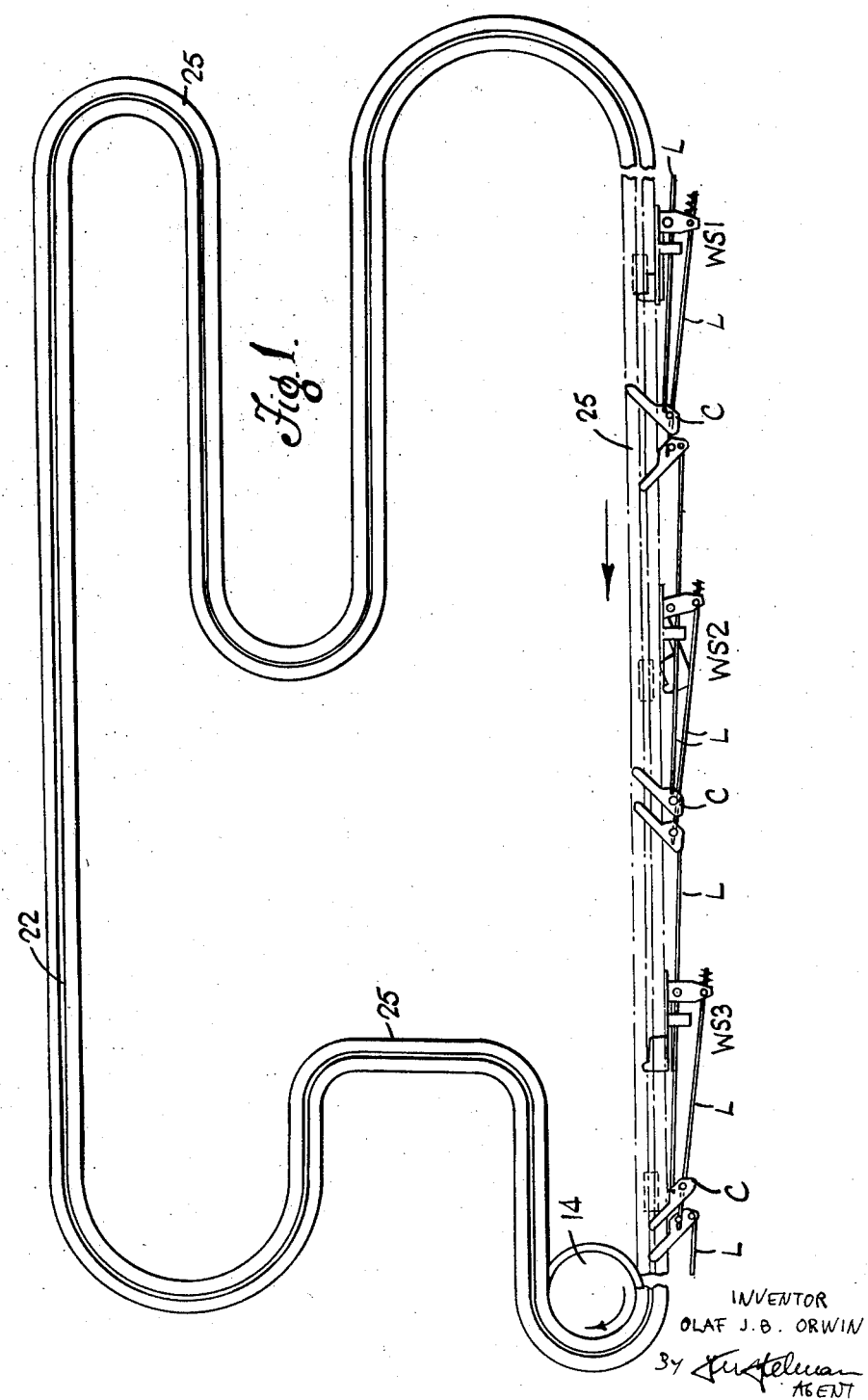
FIGURE 1 is a diagrammatic plan view of one form of conveyor system of the kind specified and embodying the present invention.

The conveyor system illustrated in the accompanying drawings forms the subject of my co-pending patent application Serial Number 117,161, filed June 14, 1961, in the specification of which application such conveyor system is more particularly described but for the purposes of the better understanding of the present invention the conveyor system described herein comprises an endless conveying element in the form of an endless chain 15 and adapted to be power driven in the known manner through chain driving wheel 14 of conventional form and indicated diagrammatically in FIGURE 1.

The chain 15 is of known construction, being built up from forged link members 16 connected pivotally together by pairs of link plates 17, some of the link members 16 being mounted on the lower ends of runners 18, the upper ends of which are forked in the known manner, each of the two arms 19 of which carries a roller 20, each roller running on one of the two flanges 21 of a chain track formed by a rail 22 of I section. Such chain 15 and its associated track is conventional and well known in the art, and the construction is such that the chain is not designed to be or required to be displaced in a vertical direction transversely of its length for the purpose of disconnecting the drive from the chain to the load supporting carriers.

Figure 2:
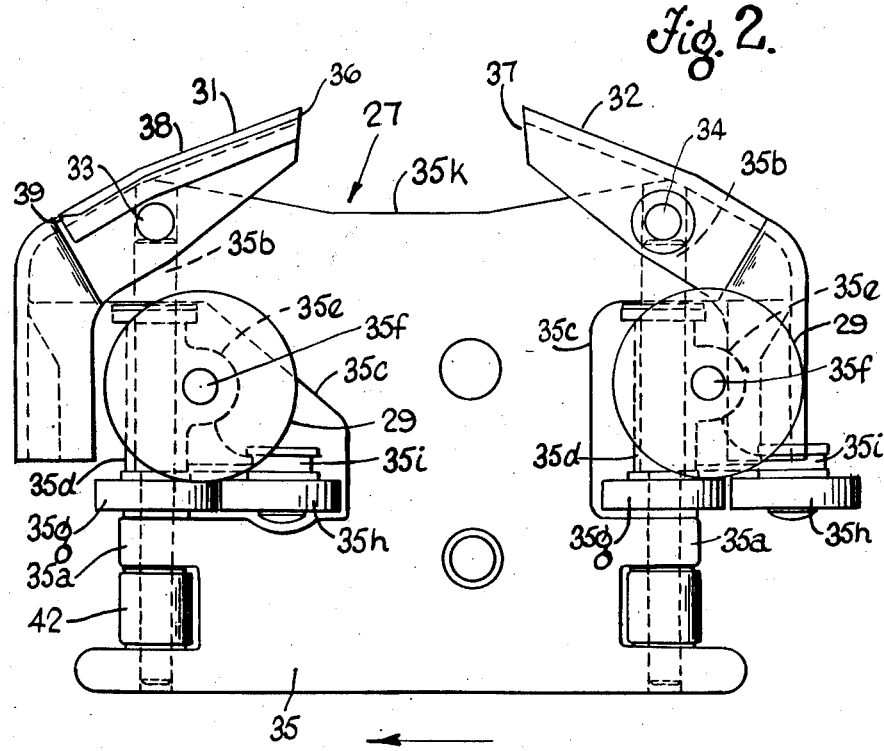
FIGURE 2 is a side elevation of one form of carrier adapted for use with the conveyor system depicted in FIGURE 1 and embodying the present invention.

The rail 22, through brackets 23, supports a carrier track 25 formed from a pair of rectangular channels 26 having their open sides directed towards one another, with the channels 26 spaced transversely apart to provide a space therebetween for the passage of the work supporting carriers which are each constructed as wheeled trolleys 27, as best shown in FIGURE 2.

The two horizontally opposed lower flanges 28 of the track forming channels 26 serve to support the load supporting wheels 29 of the trolleys 27.

As best shown in FIGURE 2, each trolley 27 comprises a plate-like body 35 of generally rectangular configuration and formed at its forwardly and rearwardly directed substantially vertical edges with bearing portions 35a, which provide support for a pair of vertically extending spindles 35b.

The forward and rearward edges of the plate 35 are recessed at 35c and in each of these recessed portions through which the spindles 35b extend are disposed vertically extending sleeves 35d, which are adapted to pivot around the spindles 35b, the sleeves being each provided with a bearing boss 35e for a transversely extending axle 35f, on opposite ends of which are mounted the trolley wheels 29.

Each spindle 35b at a position immediately below each sleeve 35d carries a guide roller 35g, to the rear of which is disposed a second guide roller 35h carried upon a rearwardly extending portion 35i of the adjacent sleeve 35d.

Thus the guide roller 35h is free to turn about the vertical axis of spindle 35b in addition to being, as in the case of the roller 35g, rotatable about its own axis. The rollers 35g and 35h have a diameter somewhat less than the spacing between the opposed edges of the opposed lower flanges 28 of the track forming channels 26, and are adapted for rolling engagement with one or the other of these two edges so as to guide the trolley 27 in a lateral sense during its advancement along the track 25.

Herein the expressions "forwardly" and "rearwardly" have reference to the designed direction of advancement of the trolleys 27 along the track 25 as denoted by the arrows in each of the drawing figures.

As described more particularly in the co-pending specification, the trolleys are adapted to be advanced along the track 25 by means of driving dogs 30 provided at intervals along the length of the chain 15 and carried upon a dog supporting plate 30a which replaces the lower of the two link plates 17 in each pair of link plates at the places where the dogs are provided. The arrangement is such that the driving dogs 30 are not displaceable relative to the conveyor chain 15 or its supporting track 22 in a direction transversely of the direction of advancement of the chain 15, i.e. the dogs 30 are secured in fixed relation to the chain 15 as opposed to being vertically slidable or mounted for pivotal movement relative to the chain so as to be displaceable relative to the chain in an upward and downward direction.

The body 35 of each trolley 27 at a position adjacent the forward and rearward ends of its upper edge 35k is provided with a pair of dog engaging shoes 31, 32, each of which is mounted for pivotal movement at 33, 34, respectively about a transverse horizontal axis in relation to the adjacent part of the trolley body 35, with the two shoes spaced relatively apart in the direction of trolley advancement.

The trolley shoe 31 constitutes a driving shoe, the rearwardly directed face 36 of which forms an abutment for engaging with the driving dog 30, whereby the drive is transmitted from the chain to the trolley to advance the same along.

The shoe 32 constitutes a retarding shoe which serves to prevent the trolley overrunning the chain 15 insofar as the forwardly directed edge 37 of this shoe is adapted to engage with a rearwardly directed face of the chain dog 30.

Figure 3:
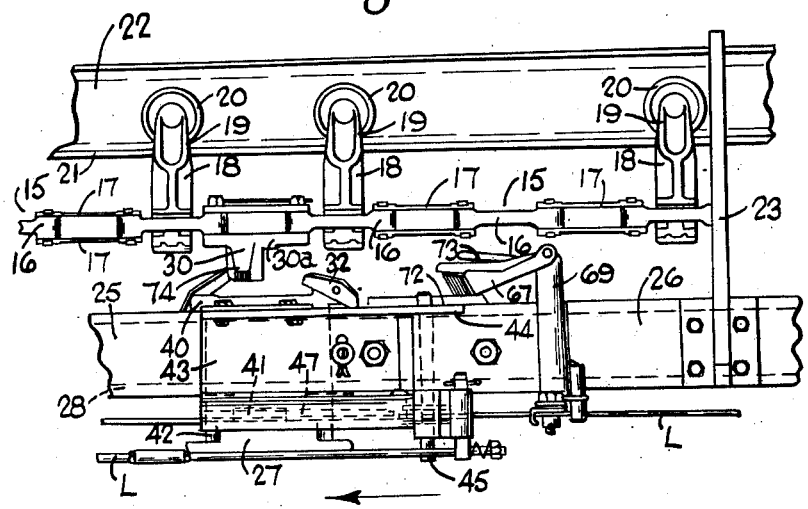
FIGURES 3 and 4 are side elevations of part of the conveyor system depicted in FIGURE 1 illustrating the carrier depicted in FIGURE 2 with its drive transmitting shoe respectively in the dog engaging and dog disengaged position.

The trolley shoes 31, 32 are gravitationally loaded so as normally to swing about their respective pivots into the dog engaging position depicted in FIGURES 2 and 3 but the shoes 31, 32 are adapted respectively to pivot in a clockwise and anti-clockwise direction respectively as viewed in FIGURE 2 so as to be disengageable from the dog 30, and in the case of the driving shoe 31, to thereby provide for disconnection of the drive between the chain 15 and each trolley 27. For this purpose each driving shoe 31 is formed in its upper part above its pivot 33 with laterally oppositely directed flanges 38, which flanges terminate, as best shown in FIGURES 2 and 6, at a forwardly and laterally extending edge 39 which is located at the forward side of the associated shoe pivot 33, one of which edges 39 is adapted when engaged adjacent the underside of such edge to swing the shoe 31 in a clockwise direction to disengage the drive from the associated chain dog 30 for the purpose of arresting the trolley at any one of a number of work stations spaced apart along the length of the carrier or trolley track 25. Thus each driving shoe 31 is substantially of T configuration in cross section.

Figure 4:
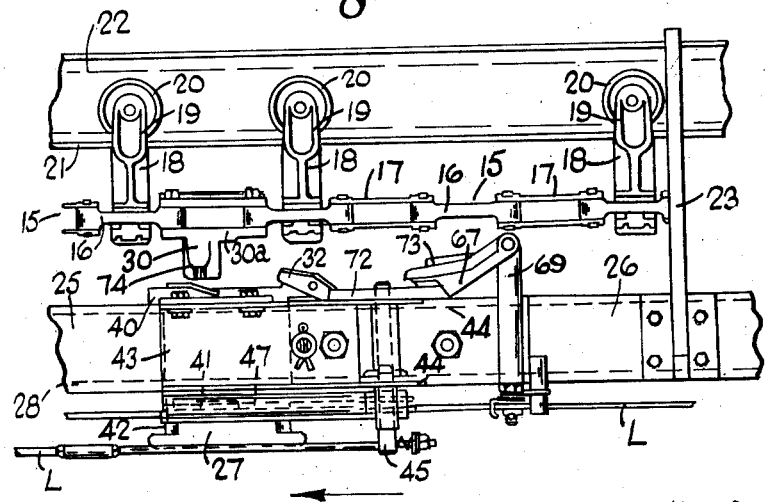
Figure 5:
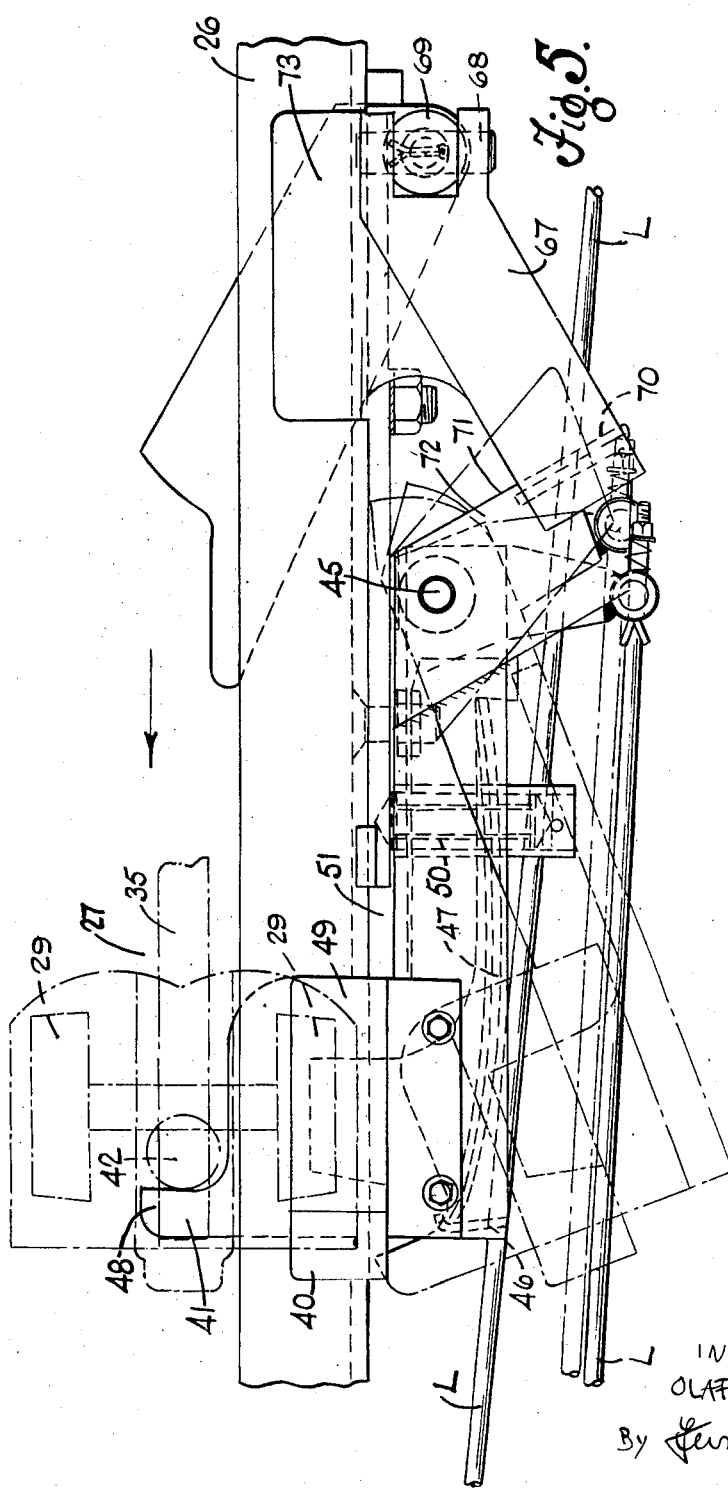
FIGURE 5 is a plan view of the construction shown in FIGURES 3 and 4 showing the various parts in a position corresponding to that depicted in FIGURE 4.

As described in the co-pending specification, the conveyor system is provided with a number of work stations at each of which any one of the several work carrying trolleys 27 which would be provided are adapted to be arrested, three such work stations being depicted diagrammatically in FIGURE 1 at WS1, WS2, and WS3, and as described in the co-pending specification, each of these work stations is provided with trolley arresting means consisting, as shown in FIGURES 3 to 5, of a trolley drive disengaging member 40 and a positive stop member 41. The trolley drive disengaging member 40 is adapted when in its arresting position to engage with the underside of the trolley driving shoe flange edge 39 so as to pivot the driving shoe 31 out of engagement with an adjacent chain driving dog 30, and the stop member 41 when displaced into its arresting position is adapted to engage at a position below the underside of the trolley track 25 with an abutment roller 42 provided on the forward end of the trolley for rotation about a vertical axis relative to the trolley so as, immediately after the drive to the trolley has been disengaged, to engage with this roller and positively to prevent the further advancement of the trolley and hold it arrested against forward movement at the work station.

This abutment roller 42 is mounted for rotation on the lower portion of the spindle 35b which is disposed adjacent the forward end of the trolley body 35.

The drive disengaging member 40 is mounted on the forward portion adjacent the upper horizontal edge thereof of a swinging bracket 43 in the form of a plate of rectangular configuration, having a pair of vertically spaced rearwardly directed arms 44, which, adjacent the rear vertical edge of the plate, support it for pivotal movement about a vertical axis from a trunnion bearing 45 carried from the adjacent channel member 26 of the trolley track.

The bracket plate 43 depends below the adjacent track channel 26, its dependent portion 46 being of substantially channel section with the mouth of the channel directed horizontally towards the underside of the track 25 and housing the trolley stop member 41, which stop member is mounted for limited sliding movement in a direction longitudinally of the track between the two sides of the channel shaped portion 46, its movement being controlled by a leaf spring 47. The arrangement permits of the stop member 41 being displaced forwardly against the pressure of spring 47 relative to the swinging bracket 43 to permit of a trolley continuing to advance, if through some failure of the mechanism, it is still positively driven from one of the chain dogs 30, so as thereby to avoid damage to the parts of the conveyor system. The spring 47 is, however, of sufficient strength as to ensure the stoppage by the member 41 of an advancing trolley, the drive to which has previously been disconnected.

As appears from FIGURE 5, the stop member 41 is formed with a nose portion 48 which projects into the path of the trolley abutment roller 42 when the swinging bracket 43 is in its operative or arresting position depicted in FIGURES 4 and 5, so as positively to prevent the trolley 27 from continuing to advance. In this position of stop member 41, trolley drive disengaging member 40 projects into the path of the driving shoe flange 38 at the adjacent side of the trolley 27. This member 40 forms a cam member and has its upper face 49 upwardly inclined in a forward direction (see FIGURE 3). Such face 49 constitutes a cam face, which, with the member 40 in the full line trolley arresting position depicted in FIGURE 5, is adapted to engage with and exert upward pressure on the aforementioned shoe flange edge 39 so that as the trolley continues to advance under the pressure of the dog 30, the shoe 31 will be progressively swung in a clockwise direction (viewed in FIGURES 2 and 3) about its pivot 33 to disengage its face 36 from dog 30 and disconnect the drive to the trolley before the abutment roller 42 on the trolley has engaged with the stop member nose 48.

Such trolley drive disengaging member 40 accordingly constitutes shoe displacing means pivotable about a vertical axis, namely the axis provided by trunnion bearing 45 between a trolley arresting position depicted in full outline in FIGURE 5 and a trolley driving position depicted in dotted outline in FIGURE 5 in which the member 40 is displaced out of the path of an advancing trolley driving shoe 31 so as to be incapable of engaging therewith so as thereby to permit of the trolley continuing to advance.

Shoe displacing means, constituted in each case by one of these trolley drive disengaging members 40, would be provided at each of the work stations, such as the work stations WS1, WS2, and WS3 depicted in FIGURE 1, and the movement of these members 40 constituting the shoe displacing means may be controlled in any suitable way which forms no part of the present invention. For example, the displacement of each member 40, with its associated stop member 41 between trolley arresting and trolley driving positions may be controlled by control means depicted at C in FIGURE 1 and constructed in accordance with the invention of my aforementioned co-pending specification as fully described therein. For this purpose, each swinging bracket 43 would be biased in a direction away from the adjacent trolley track 25 by a compression spring 50 acting between the swinging bracket 43 and an attachment plate 51 by which the parts associated with the swinging bracket are secured at the desired position to the adjacent side of the trolley track 25, the arrangement being such that each swinging bracket 43, with its associated drive disengaging member 40 and stop member 41, is swung away from the track under the pressure of spring 50 into an inoperative position except when displaced into the trolley arresting position by the operation of the control means referred to in the co-pending specification, and connected as therein described, to each bracket 43 by linkage herein depicted at L.

Preferably, however, as shown in FIGURE 5, means which form no part of the present invention, are provided for preventing each swinging bracket 43 with its associated drive disengaging member 40 and stop member 41 moving into the inoperative position to release a trolley when permitted so to do until this is under the control of the next advancing chain dog 30, even though movement of such swinging bracket 43, into the inoperative position may have been permitted by the operation of the control means referred to in the co-pending specification.

For this purpose, as shown in FIGURE 5, adjacent each work station there is provided a latch member 67 mounted at its rear end for pivotal movement about a horizontal transverse axis at pivot 68 carried on the upper end of post 69 secured to the adjacent part of track 25. The forward end 70 of this latch member is adapted, when the swinging bracket is in the arresting position illustrated in FIGURE 5, to engage with the rearwardly directed edge 71 of follower plate 72 connected to the swinging bracket 43, so as thereby positively to retain the bracket with the associated members 40 and 41 in their arresting position except when the latch member 67 is raised to bring its forward end 70 clear of the follower plate 72 under the action of a chain dog 30 advancing ready to engage with a previously arrested trolley 27.

For this purpose the latch member 67 is provided with a downwardly forwardly inclined cam portion 73, the underside of which is adapted to engage with a laterally projecting lug 74 on the chain dog 30 so as thereby momentarily to raise the latch as the dog advances into a trolley engaging position and permit of the bracket 43, with the members 40 and 41, swinging outwardly clear of the trolley under the pressure of spring 50.

Such an arrangement avoids any possibility of a trolley advancing not under the control of a dog 30 by premature movement of the swinging bracket 43 into its inoperative or free position when permitted so to do by the operation of the control means described in the co-pending specification.

From the foregoing description it will be appreciated that the drive between the conveyor element and the work supporting carriers constituted by the trolleys 27 can be disengaged without in any way displacing the trolley driving dogs 30 relative to the chain 15 as well as without displacing the chain 15 itself in a direction transversely of its length.

Accordingly, the present invention enables the conveyor element to be made of a very simple construction, for example as the above described chain 15 embodying forged links 16 which, since they are forgings, are not constructed to precision standards, with the dogs 30 mounted directly on their supporting links 30a forming part of the conveyor chain, as for example by welding the dogs 30 to these links 30a.

What I claim then is:

1. A conveyor system comprising:
   (a) a conveyor track,
   (b) an endless conveyor element supported from said conveyor track and having fixedly mounted thereon a plurality of driving dogs spaced along the length of the conveyor element and projecting downwardly therefrom with each dog having a driving face directed in the direction of advancement of the conveyor element,
   (c) a trolley track supported beneath the conveyor track,
   (d) a plurality of wheeled trolleys disposed beneath the underside of the conveyor element and advanceable along said trolley track,
   (e) a driving shoe on each trolley extending in the direction of trolley advancement and pivoted to the trolley intermediate the two ends of the shoe for movement about an axis transverse to the direction of trolley advancement,
   (f) the end of each trolley shoe situated rearmost in the direction of trolley advancement providing a driving face engageable with the driving face of any one of said dog driving faces,
   (g) each trolley shoe having a downwardly directed abutment face situated on that side of the shoe pivot which is foremost having regard to the designed direction of advancement of the trolley,
   (h) a plurality of trolley drive disengaging elements spaced along the length of the trolley track, each having a cam portion movable in a substantially horizontal direction transverse to the length of the trolley track between an inoperative position in which the cam portion is clear of the path of advancement of the trolleys and trolley shoes thereon, and an operative position in which the cam portion is adapted to engage with the downwardly directed abutment face of a trolley shoe engaged by one of said dogs,
   (i) each of said cam portions in their operative position being adapted to apply upwardly directed pressure to the engaged trolley shoe abutment face and thus rock the trolley shoe about its pivot to swing the dog engaging end of the shoe downwardly and out of driving engagement with said dog,
   (j) and means for actuating said trolley drive disengaging elements to effect displacement of their respective cam portions between the said two positions.

2. A conveyor system comprising:
   (a) a conveyor track, (b) an endless conveyor element supported from said conveyor track and having fixedly mounted thereon a plurality of driving dogs spaced along the length of the conveyor element and projecting downwardly therefrom with each dog having a driving face directed in the direction of advancement of the conveyor element, (c) a trolley track supported beneath the conveyor track, (d) a plurality of wheeled trolleys disposed beneath the underside of the conveyor element and advanceable along said trolley track, (e) a driving shoe on each trolley extending in the direction of trolley advancement and pivoted to the trolley intermediate the two ends of the shoe for movement about an axis transverse to the direction of trolley advancement, (f) the end of each trolley shoe situated rearmost in the direction of trolley advancement providing a driving face engageable with the driving face of any one of said dog driving faces, (g) each trolley shoe having a downwardly directed abutment face situated on that side of the shoe pivot which is foremost having regard to the designed direction of advancement of the trolley, (h) a plurality of trolley drive disengaging elements spaced along the length of the trolley track, each having a cam portion movable in a substantially horizontal direction transverse to the length of the trolley track between an inoperative position in which the cam portion is clear of the path of advancement of the trolleys and trolley shoes thereon, and an operative position in which the cam portion is adapted en engage with the downwardly directed abutment face of a trolley shoe engaged by one of said dogs, (i) each of said cam portions in their operative position being adapted to apply upwardly directed pressure to the engaged trolley shoe abutment face and thus rock the trolley shoe about its pivot to swing the dog engaging end of the shoe downwardly and out of driving engagement with said dog, and (k) a stop member connected to each cam portion and adapted in the operative position of each cam portion to project across the path of the advancing trolleys.

3. A conveyor system according to claim 2 wherein:

(l) each stop member is aligned transversely in relation to its associated cam portion, and (m) each trolley driving shoe is pivoted to that end of the trolley which is directed forwardly for the designed direction of trolley advancement, each said driving shoe abutment face extending forwardly beyond said forward end of the associated trolley, the arrangement permitting of the abutment face being engaged by one of said cam portions in operative position and the shoe pivoted out of engagement with one of said driving dogs before the stop member associated with such cam portion has been engaged by the advancing trolley.

4. A conveyor system comprising:

(a) a conveyor track, (b) an endless conveyor element supported from said conveyor track and having fixedly mounted thereon a plurality of driving dogs spaced along the length of the conveyor element and projecting downwardly therefrom with each dog having a driving face directed in the direction of advancement of the conveyor element, (c) a trolley track supported beneath the conveyor track, (d) a plurality of wheeled trolleys disposed beneath the underside of the conveyor element and advanceable along said trolley track, (n) a driving shoe on each trolley extending in the direction of trolley advancement comprising a web portion pivoted to the trolley intermediate the two ends of the shoe for movement about an axis transverse to the direction of trolley advancement, and a flange portion on said web portion extending transversely of said web portion with said flange portion extending on that side of the shoe pivot which is foremost having regard to the designed direction of advancement of the trolley, (o) a plurality of trolley drive disengaging elements spaced along the length of the trolley track, each having a cam portion movable in a substantially horizontal direction transverse to the length of the trolley track between an inoperative position in which the cam portion is clear of the path of advancement of the trolleys and trolley shoes thereon, and an operative position in which the cam portion is adapted to engage with the under side of the flange portion of that trolley shoe engaged by one of said dogs, (p) each of said cam portions in their operative position being adapted to apply upwardly directed pressure to the engaged trolley shoe flange portion and thus rock the trolley shoe about its pivot to swing the dog engaging end of the shoe downwardly and out of driving engagement with said dog, (j) and means for actuating said trolley drive disengaging elements to effect displacement of their respective cam portions between the said two positions.

5. A conveyor system comprising:

(a) a conveyor track, (b) an endless conveyor element supported from said conveyor track and having fixedly mounted thereon a plurality of driving dogs spaced along the length of the conveyor element and projecting downwardly therefrom with each dog having a driving face directed in the direction of advancement of the conveyor element, (c) a trolley track supported beneath the conveyor track, (d) a plurality of wheeled trolleys disposed beneath the under side of the conveyor element and advanceable along said trolley track, (q) each trolley comprising a vertically disposed substantially rectangular shaped plate-like body having its plane substantially parallel to the designed direction of trolley advancement, (r) a pair of driving dog engaging shoes mounted on each rectangular body one adjacent each of the two upper corners of the plate for pivotal movement about an axis transverse to the plane of the plate, (s) the two shoes having opposed ends spaced apart longitudinally of the trolley to receive therebetween one of said conveyor element driving dogs with the shoe which is foremost in the direction of trolley advancement having said end thereof engageable with said driving dog, (t) the foremost shoe on each trolley having a downwardly directed abutment face situated on that side of the shoe pivot which is foremost having regard to the designed direction of advancement of the trolley, (h) a plurality of trolley drive disengaging elements spaced along the length of the trolley track, each having a cam portion movable in a substantially horizontal direction transverse to the length of the trolley track between an inoperative position in which the cam portion is clear of the path of advancement of the trolleys and trolley shoes thereon, and an operative position in which the cam portion is adapted to engage with the downwardly directed abutment face of a trolley shoe engaged by one of said dogs, (i) each of said cam portions in their operative position being adapted to apply upwardly directed pressure to the engaged trolley shoe abutment face and thus rock the trolley shoe about its pivot to swing the dog engaging end of the shoe downwardly and out of driving engagement with said dog, (j) and means for actuating said trolley drive disengaging elements to effect displacement of their respective cam portions between the said two positions.

6. A conveyor system according to claim 5 wherein the plate-like body of each trolley is provided with two pairs of longitudinally spaced track engaging wheels each mounted upon a supporting axle, the axle associated with each pair of track engaging wheels being itself mounted for pivotal movement relative to the trolley body about a vertical axis, there being in association with each pair of track engaging wheels rollers adapted for guiding engagement with the trolley supporting track so as thereby to guide the trolley in a lateral sense.

References Cited in the file of this patent

UNITED STATES PATENTS

| | | |
|---|---|---|
| 2,883,942 | Johnson | Apr. 28, 1959 |
| 2,987,012 | King | June 6, 1961 |